US010979475B2

(12) United States Patent
Barkley et al.

(10) Patent No.: US 10,979,475 B2
(45) Date of Patent: *Apr. 13, 2021

(54) PACKAGING CONTENT FOR DELIVERY

(71) Applicant: Comcast Cable Communications, LLC, Philadelphia, PA (US)

(72) Inventors: James Barkley, Downingtown, PA (US); Weidong Mao, West Windsor, NJ (US)

(73) Assignee: Comcast Cable Communications, FFC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,978

(22) Filed: Jan. 2, 2020

(65) Prior Publication Data

US 2020/0252443 A1    Aug. 6, 2020

Related U.S. Application Data

(63) Continuation of application No. 15/246,884, filed on Aug. 25, 2016, now Pat. No. 10,574,718.

(51) Int. Cl.
*G06F 15/16* (2006.01)
*H04L 29/06* (2006.01)
(Continued)

(52) U.S. Cl.
CPC ........ *H04L 65/607* (2013.01); *H04L 12/2878* (2013.01); *H04L 12/2887* (2013.01);
(Continued)

(58) Field of Classification Search
CPC . H04L 65/607; H04L 65/4084; H04L 65/602; H04L 12/2878; H04L 12/2887;
(Continued)

(56) References Cited

U.S. PATENT DOCUMENTS 7,010,598 B2* 3/2006 Sitaraman ............... H04L 43/00
709/224
7,409,456 B2* 8/2008 Sitaraman ......... H04L 29/06027
370/466
(Continued)

OTHER PUBLICATIONS

"Digital Video Broadcasting (DVB); MPEG-DASH Profile for Transport of ISO BMFF Based DVB Services over IP Based Networks," DVB Document A168; Jul. 2014.
(Continued)

*Primary Examiner* — Alicia Baturay
(74) *Attorney, Agent, or Firm* — Banner & Witcoff, Ltd.

(57) ABSTRACT

Content segments may be generated/sent in a different format than the format they are stored/received. Timing information for packets comprising the content segments in the requested format may be based on timing information for packets comprising the content segment in the stored format. For example, the timing information of the first packet in the requested format may comprise the timing information of the first packet in the stored format. The timing information of other packets in the requested format may be based on the timing information of the first packet in the requested format.

46 Claims, 7 Drawing Sheets

(51) Int. Cl.
*H04N 21/00* (2011.01)
*H04N 21/8543* (2011.01)
*H04N 21/2383* (2011.01)
*H04N 21/845* (2011.01)
*H04N 21/8547* (2011.01)
*H04L 12/28* (2006.01)
*H04N 21/2368* (2011.01)
*H04L 27/36* (2006.01)

(52) U.S. Cl.
CPC ........ *H04L 65/4084* (2013.01); *H04L 65/602* (2013.01); *H04N 21/00* (2013.01); *H04N 21/2368* (2013.01); *H04N 21/2383* (2013.01); *H04N 21/8456* (2013.01); *H04N 21/8543* (2013.01); *H04N 21/8547* (2013.01); *H04L 27/36* (2013.01)

(58) Field of Classification Search
CPC .... H04L 27/36; H04N 21/00; H04N 21/2368; H04N 21/2383; H04N 21/8456; H04N 21/8543; H04N 21/8547
USPC ......................................................... 709/219
See application file for complete search history.

(56) References Cited

U.S. PATENT DOCUMENTS

| | | | | |
|---|---|---|---|---|
| 7,647,418 B2* | 1/2010 | Ash | ................ | H04N 21/64738 709/231 |
| 7,873,740 B2* | 1/2011 | Sitaraman | ........... | H04L 65/4092 709/231 |
| 7,991,904 B2* | 8/2011 | Melnyk | .............. | H04N 21/6582 709/230 |
| 8,135,855 B2* | 3/2012 | Sitaraman | ............. | H04L 67/327 709/231 |
| 8,489,923 B1* | 7/2013 | Lakshminarayanan | ...................... | H04L 12/2812 714/26 |
| 8,566,436 B1* | 10/2013 | Stoica | ................. | H04L 67/1085 709/223 |
| 8,589,579 B2* | 11/2013 | Samuels | ................. | H04L 49/90 709/231 |
| 8,819,088 B2* | 8/2014 | Iyer | ..................... | G11B 27/329 707/812 |
| 8,924,580 B2* | 12/2014 | Begen | ................. | H04N 21/6125 709/231 |
| 8,930,513 B1* | 1/2015 | Richardson | ......... | H04L 43/0852 709/223 |
| 9,100,288 B1* | 8/2015 | Ganjam | ................ | H04W 4/021 |
| 9,118,630 B2* | 8/2015 | Saremi | ................ | H04L 63/0428 |
| 9,124,947 B2* | 9/2015 | Bjordammen | ... | H04N 21/23418 |
| 9,135,048 B2* | 9/2015 | Klein | .................... | G06F 9/5077 |
| 9,253,065 B2* | 2/2016 | Richardson | ............. | H04L 47/70 |
| 9,294,526 B2* | 3/2016 | George | ........... | H04N 21/44209 |
| 9,332,051 B2* | 5/2016 | Brueck | ................. | H04L 65/608 |
| 9,386,308 B2* | 7/2016 | Li | ........................ | H04N 19/152 |
| 9,426,089 B2* | 8/2016 | Gordon | ................ | H04N 21/234 |
| 9,479,447 B2* | 10/2016 | Samuels | ................. | H04L 47/38 |
| 9,495,338 B1* | 11/2016 | Hollis | ..................... | G06F 40/14 |
| 9,503,765 B2* | 11/2016 | Bjordammen | ... | H04N 21/26258 |
| 9,628,554 B2* | 4/2017 | Marshall | ................ | H04L 67/10 |
| 9,628,786 B2* | 4/2017 | Howcroft | ........... | H04N 21/4425 |
| 9,667,801 B2* | 5/2017 | Vander Mey | ....... | H04M 7/0072 |
| 9,729,287 B2* | 8/2017 | Reddappagari | ..... | H04M 7/0072 |
| 9,729,601 B2* | 8/2017 | Reddappagari | ....... | H04L 65/602 |
| 9,866,605 B2* | 1/2018 | Begen | ................ | H04N 21/6125 |
| 10,110,694 B1* | 10/2018 | Watson | ............... | H04L 65/4092 |
| 10,116,715 B2* | 10/2018 | Rodbro | ................... | H04L 65/80 |
| 10,116,724 B2* | 10/2018 | George | ................... | H04L 65/80 |
| 10,574,718 B2* | 2/2020 | Barkley | ............. | H04N 21/8547 |
| 2014/0344410 A1* | 11/2014 | Saremi | ................... | H04L 65/602 709/219 |
| 2015/0208095 A1* | 7/2015 | Schierl | ................. | H04N 19/436 19/436 |
| 2015/0271226 A1* | 9/2015 | Luby | ..................... | H04L 47/125 709/231 |
| 2016/0164937 A1* | 6/2016 | Reddappagari | ....... | H04L 65/601 370/259 |
| 2016/0165015 A1* | 6/2016 | Reddappagari | ......... | H04L 69/22 370/392 |
| 2016/0269457 A1* | 9/2016 | Tiraspolsky | .......... | H04L 65/605 |
| 2016/0337424 A1* | 11/2016 | Mandyam | ........ | H04N 21/26258 |
| 2016/0373324 A1* | 12/2016 | Gholmieh | ............... | H04L 43/06 |
| 2016/0373546 A1* | 12/2016 | Lotfallah | ................ | H04L 67/02 |
| 2016/0380853 A1* | 12/2016 | Lotfallah | ............ | H04L 12/6418 709/224 |
| 2017/0063960 A1* | 3/2017 | Stockhammer | .... | H04N 21/8106 |
| 2017/0094295 A1* | 3/2017 | Gu | ........................ | H04L 1/0025 |
| 2017/0094296 A1* | 3/2017 | Gu | ...................... | H04L 43/0864 |
| 2017/0353768 A1* | 12/2017 | Muvavarirwa | .. | H04N 21/64322 |

OTHER PUBLICATIONS

"About Dash Industry Forum;" Sep. 9, 2015; http://dashif.org/about/.
"MPEG Group of Pictures—GOP Definition and Diagram," Dec. 7, 2015; http://www.iptvdictionary.com/iptv_dictionary_MPEG_GOP_definition.html.
"A Guide to MPEG Fundamentals and Protocol Analysis;" Copyright 2000; www.tektronix.com/video_audio/.
"International Telecommunication Union—Series H: Audiovisual and Multimedia Systems—Infrastructure of audiovisual services—Coding of moving video;" Feb. 2014.
"What is MPEG DASH?;" Streaming Media Magazine; Sep. 9, 2015; http://www.streamingmedia.com/Articles/Editorial/What-Is-.../What-is-MPEG-DASH-79041.aspx.
"What is a Program Clock Reference (PCR) in MPEG?;" Tektronix; Dec. 8, 2015; http://www.tek.com/support/faqs/what-program-clock-reference-pcr-mpeg.

* cited by examiner

US 10,979,475 B2

PACKAGING CONTENT FOR DELIVERY

CROSS-REFERENCE TO RELATED APPLICATIONS

The present application is a continuation of U.S. application Ser. No. 15/246,884, filed Aug. 25, 2016, and entitled "Packaging Content for Delivery", the specification for which is hereby incorporated by reference in its entirety for all purposes.

BACKGROUND

Content can be delivered to customers using several different methods of delivery, such Quadrature Amplitude Modulation (QAM) delivery and Internet Protocol (IP) delivery. However, content delivered via QAM and content delivered via IP may be prepared differently, using separate storage and/or delivery infrastructures. Separate content storage and delivery devices may increase the size and cost of sending content to customers. The cost increases as the library of content available to customers increases. There is a need to reduce the number of devices used for content preparation, storage, and delivery, and to reduce the cost of delivering content to consumers.

SUMMARY

This summary is not intended to identify critical or essential features of the disclosures herein, but instead merely summarizes certain features and variations thereof. Other details and features will also be described in the sections that follow.

Systems described herein may comprise infrastructure for delivering content formatted for IP delivery and/or QAM delivery. For example, the system may receive (e.g., ingest) content, such as MPEG content. The content may comprise a plurality of content segments, including one or more video segments and one or more audio segments. Each of the content segments may have a plurality of data packets (e.g., video packets or audio packets), and one or more of the data packets may have corresponding location information (e.g., a timestamp, such as a program clock reference (PCR)). The system may generate location information for one or more of the other data packets that do not already have corresponding location information, and generating the location information may be based on the existing location information. The system may also use manifest data that identifies each of the plurality of content segments to generate index data for the plurality of content segments. The plurality of content segments, along with the index data, may be delivered to one or more user devices, such as via QAM delivery.

The foregoing methods and other methods described herein may be performed by a system, a computing device, a computer readable medium storing computer-executable instructions for performing the methods, and/or an apparatus having a processor and memory storing computer-executable instructions for performing the methods.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
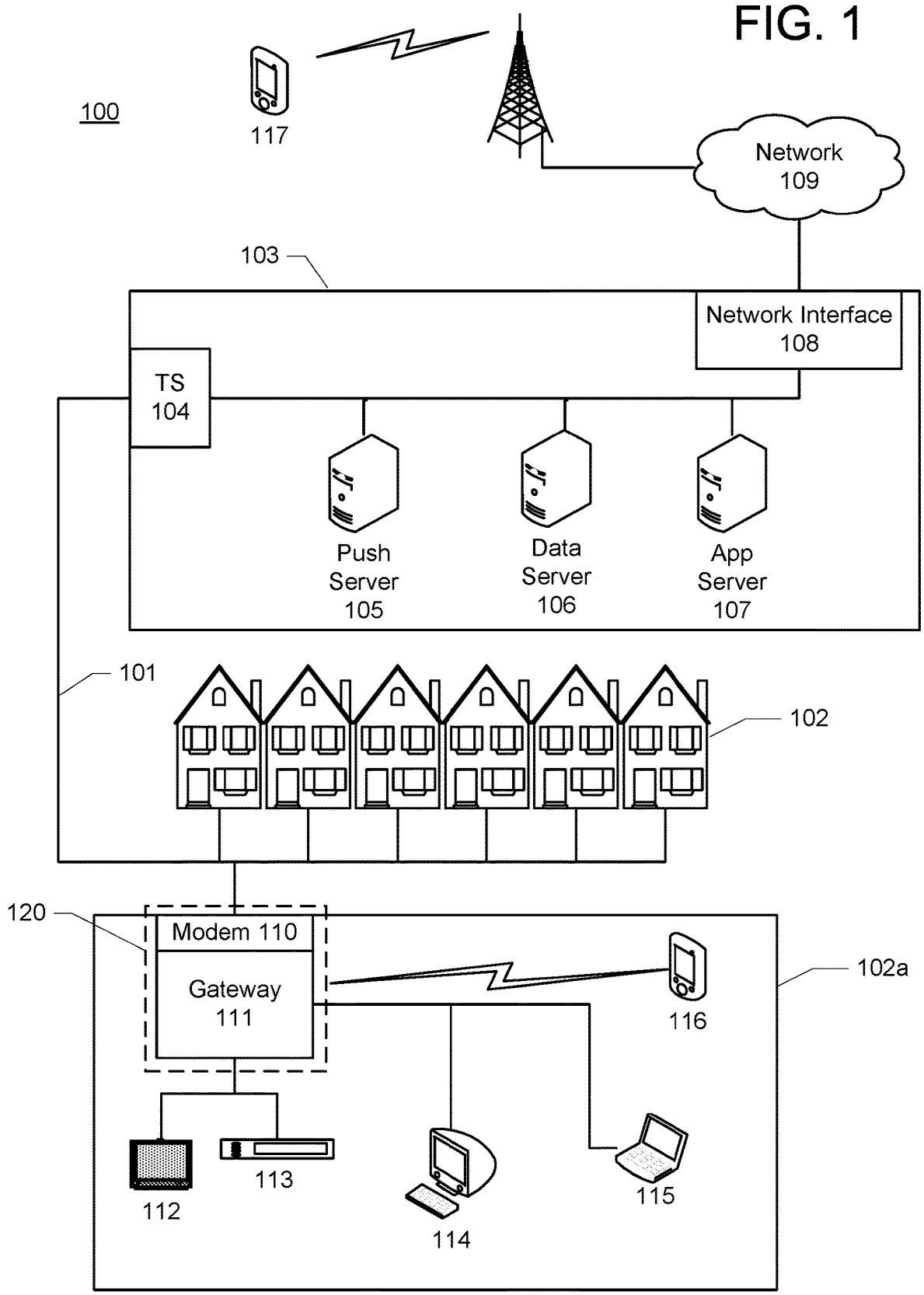
FIG. 1 shows an example information access and distribution network.

FIG. 1 shows an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 in the vicinity (which may be many miles) of the local office 103. Although the term home is used by way of example, locations 102 may be any type of user premises, such as businesses, institutions, etc. The links 101 may include components not shown, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include a push notification server 105. The push notification server 105 may generate push notifications to deliver data and/or commands to the various locations 102 in the network (or more specifically, to the devices in the locations 102 that are configured to detect such notifications). The local office 103 may also include a data server 106. The data server 106 may be one or more computing devices that are configured to provide data to users in the homes. This data may be, for example, video on demand (e.g., video on demand movies), television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102.

An example location 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
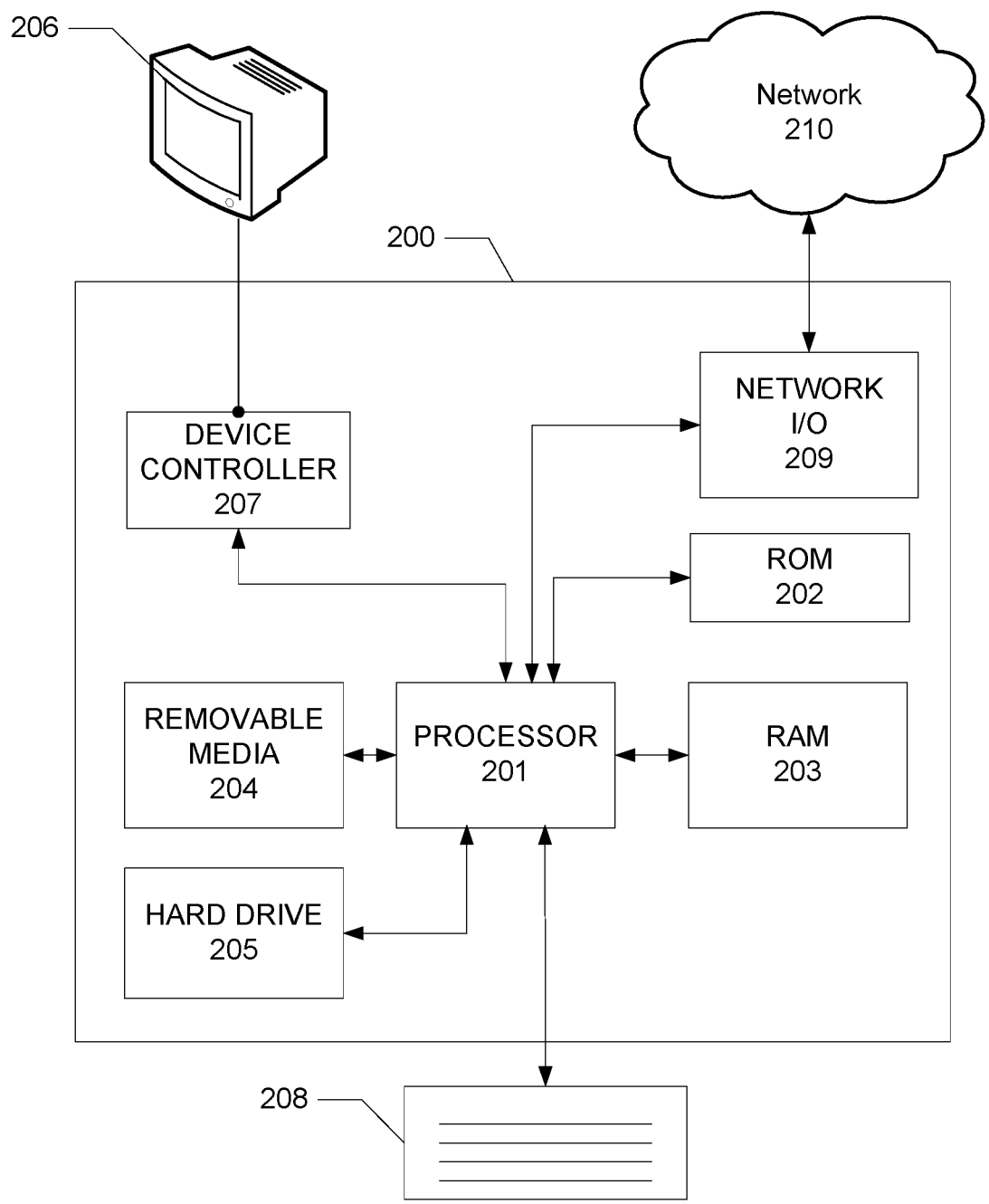
FIG. 2 shows an example hardware and software platform on which various elements described herein can be implemented.

FIG. 2 shows hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc.

The computing device 200 may also include one or more network interfaces 209, such as input/output circuits (such as a network card) to communicate with an external network 210. The interface 209 may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The computing device 200 may communicate with the external networks 210 or other devices using one or more communication protocols, such as wired communication protocols and wireless communication protocols (e.g., Wi-Fi, Bluetooth, Zig-Bee, Z-Wave, etc.). Some of the elements shown in FIG. 2 may also be implemented in software.

Figure 3:
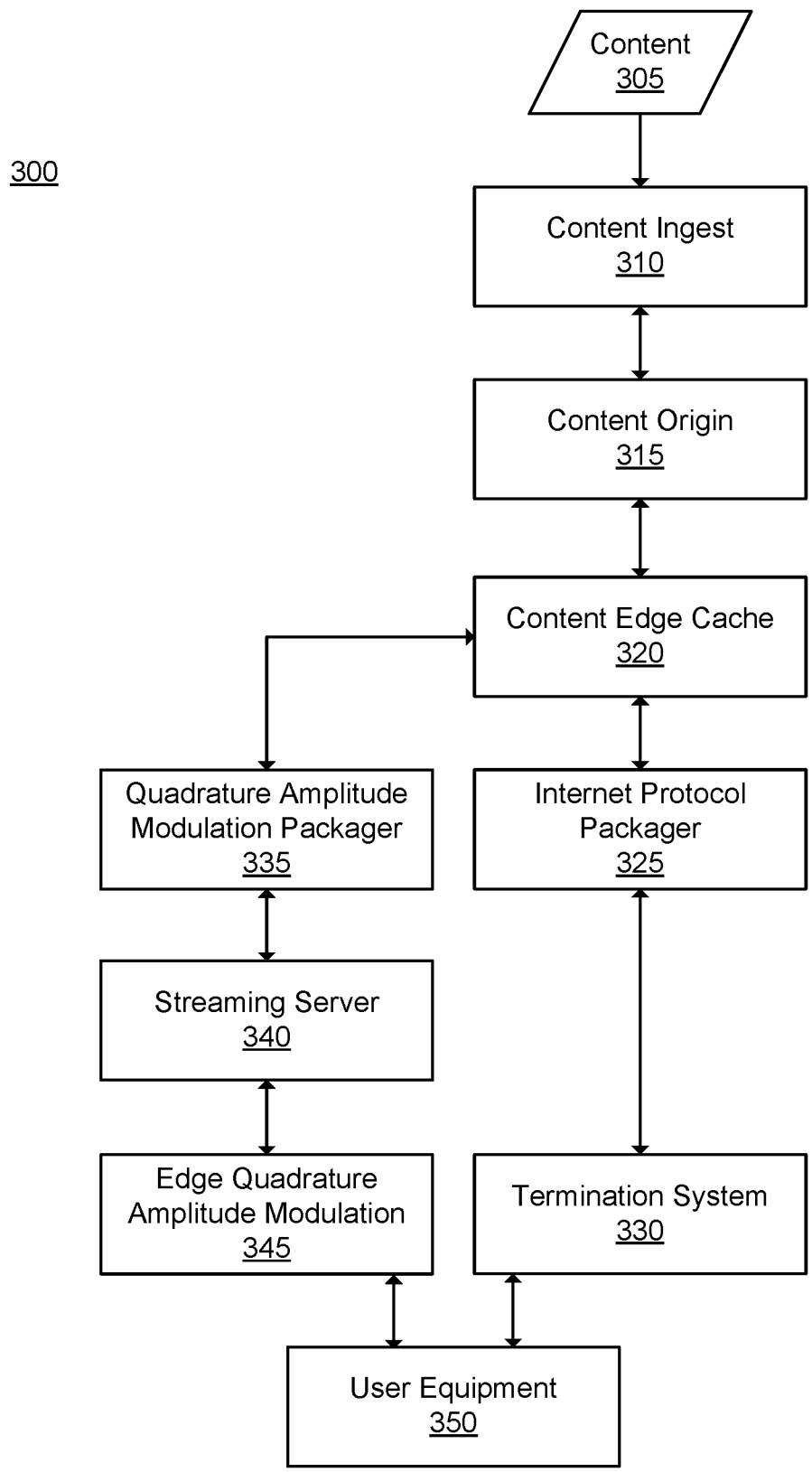
FIG. 3 shows an example network of devices for content preparation and delivery according to one or more illustrative aspects of the disclosure.

FIG. 3 shows an example network 300 of devices for content preparation and delivery according to one or more illustrative aspects of the disclosure. The network 300 may deliver content via a plurality of different delivery mechanisms, such as IP delivery and QAM delivery. The network 300 may use some of the same devices for both IP delivery and QAM delivery, which may reduce the number of devices in the network 300 and accordingly result in network and cost savings. For example, IP and QAM delivery may share one or more ingest device, one or more origin device, and/or one or more content delivery network (CDN), as will be described below.

The network 300 may comprise a content ingest device 310. The content ingest device 310 may receive content 305 from a content source (not shown). The content received by the ingest device 310 may be, for example, formatted as an MPEG (e.g., MPEG4) package. The content ingest device 310 may be used to, for example, receive (e.g., ingest) content, which may be formatted by the network 300 for IP delivery or QAM delivery. If the content 305 received from the content source is multiplexed, the content ingest device 310 may demultiplex the content. For example, if the received content comprises an MPEG2 single program transport stream, the content ingest device 310 may demultiplex the stream to create multiple single program transport streams, each with a single elementary stream. An elementary stream may comprise a stream (e.g., a file) where the data in the stream is for a single component. A transport stream may comprise one or more elementary stream. In some aspects, a single elementary stream may comprise a transport stream that contains one elementary stream. If the multiplexed stream comprises one video component and two audio components, the ingest device 310 may demultiplex the stream to generate a video stream and two audio streams.

For QAM ingest, the ingest device 310 may receive the content 305 and generate a plurality of files for the content 305, such as trick play files (e.g., files played back during a rewind or a fast forward operation). For example, the ingest device 310 may generate a 4× rewind file, a 4× fast forward file, an 8× rewind file, an 8× fast forward file, a 16× rewind file, a 16× fast forward file, and the like. Each of the rewind and fast forward files may be played back in response to a user command to rewind or fast forward the content. In some aspects, the content 305 might not be segmented and may instead each be stored as one large file. Moreover, the content might not have manifest data, but might have index data (e.g., an index file). The index file may indicate which specific video and/or audio frames to deliver to the user device, such as in the case of a fast forward command, a rewind command, or another trick play command received from the user equipment (e.g., user device). For example, if a user selects 4× rewind, the network 300 may deliver every fourth video frame. An index file might be used for QAM delivery because the content might be larger in size (compared to content delivered via IP delivery), and the user equipment might not have enough buffer storage to store the content. The structure and use of the manifest file and the index file will be described in further detail below.

For IP ingest, the ingest device 310 may receive the content 305, but might not generate separate fast forward or rewind (or other trick play) files. Instead, the ingest device 310 may segment the content, including each of the audio and video portions, into separate files. For example, after demultiplexing an MPEG2 transport stream into separate MPEG2 transport streams, each with a single elementary (e.g., video or audio) stream, the ingest device 310 may segment each of single program transport streams into multiple files. Each file may continue to use the MPEG transport stream encapsulation. As a result of this process, each file may carry information about its relative position in the original multiplexed MPEG transport stream.

Exemplary segment lengths include, but are not limited to, half of a second, two seconds, or ten seconds. By segmenting the content, the user equipment may play back the content as soon as at least one segment is received (e.g., rather than waiting for all of the segments to be received). Playback of content delivered via QAM, on the other hand, might not be performed until the entire QAM file is received by the client device. In other aspects, for IP playback, multiple segments may be retrieved before playout begins, and QAM playout may occur in real time, as the data is received.

The content 305 received by the content ingest 310, which may be formatted by the network 300 for IP delivery, may include manifest data (e.g., a manifest file). The manifest file may indicate the segments (e.g., video segments and audio segments) that make up a particular content item. The manifest file may also be used to select the segment to transmit to and/or play back by the user equipment. The content 305 received by the content ingest 310, on the other hand, might not have index data (e.g., an index file) because user equipment might traditionally buffer content for playback without using an index file. However, in order to deliver the content using the infrastructure used to deliver content via QAM delivery, index data may be generated for the content before transmission over QAM equipment to user equipment. Generating index files for content will be described in further detail below.

The network 300 may comprise a content origin device 315, which may be an IP origin device and/or a QAM origin device. The origin device 315 may comprise one or more servers that store content, such as video and/or audio content, that has been ingested by the content ingest device 310. The content origin device 315 may store the ingested content 305, trick play files generated by the content ingest device 310, and IP segmented content. For example, the content origin device 315 may store MPEG adjustable bit rate (ABR) data (e.g., files) in IP Dynamic Adaptive Streaming over HTTP (DASH) format. The content origin device 315 may also store trick files.

The network 300 may comprise a content edge cache device 320. The edge cache device 320 may be located at the edge of the network 300. The edge cache device 320 may comprise a large amount of physical memory for temporary storage of data (e.g., content or files) being delivered to users.

The network 300 may comprise an Internet Protocol (IP) packager device 325, which may also be at the edge of the network 300. The packager 325 may transform a manifest file for the content to be delivered. For example, the packager 325 may convert the manifest file from a single (e.g., universal) format used by the content provider or content source to a particular format for each user device. The IP packager device 325 may also apply protection (e.g., encryption or encoding) to the content, such as digital rights management (DRM). The protection may prevent customers not authorized to access the content from decoding and/or otherwise accessing the content. The IP packager device 325 may also interact with other devices to authenticate and/or authorize specific customers for the delivered content. By adding content protection at the edge of the network 300 (e.g., at the IP packager device 325), more manifest file types and encryptions may be utilized without significantly impacting the capacity of the edge cache device 320. The network 300 may also comprise a manifest manipulator device (not shown), which may add advertisements and the like to the delivered content. The manifest manipulator may be located between the packager device 325 and the termination system 330.

The network 300 may comprise a termination system 330. As explained above, the termination system 330 may comprise, for example, a CMTS, optical fiber, or any other type of termination system. The termination system 330 may be configured to manage communications between backend devices and user equipment (e.g., user devices).

The network 300 may comprise a quadrature amplitude modulation (QAM) packager device 335. The content edge cache 320 may send segmented single elementary stream files to the QAM packager device 335. The QAM packager device 335 may multiplex and send multiplexed content to a streaming server and may also generate index data for the multiplexed content. The QAM packager device 335 will be described in further detail below with reference to FIG. 4.

The network 300 may comprise a streaming server 340. The streaming server 340 may receive a request from the user equipment 350 for content, such as to move to a specific location in the content, to switch to a fast forward file, to switch to a rewind file, and the like. For example, the streaming server 340 may retrieve the index file for the content and find the byte offset within the index file to determine the packet or frame to switch to. The streaming server 340 may receive from the QAM packager 335, a single multiplexed file containing an MPEG (e.g., MPEG2)

transport stream (and its matched QAM index file). As will be described below, the index file may be generated based on a manifest file for the content.

In some aspects, the QAM packager device 335 may be geographically co-located with the streaming server 340. This may be beneficial when the QAM packager device 335 uses and/or incorporates a large cache storage, and there is a significant amount of local data traffic between the QAM packager device 335 and the streaming server 340. Moreover, the QAM packager device 335 and the streaming server 340 may use the same cache storage if they are geographically co-located. That is, data may be transmitted between the QAM packager device 335 and the streaming server 340 over the network switch (rather than the network backbone), resulting in bandwidth savings and cost savings for the network backbone. The QAM packager 335 may also be geographically co-located with the edge QAM device 345 (described below), which may result in a reduction of network infrastructure used for content transmission.

The network 300 may comprise an edge QAM device 345, such as a video server computing device that is located close to the customer or their user device. In QAM delivery, data may be encapsulated all the way until the edge QAM device 345. The edge QAM device 345 may remove the encapsulation and deliver the content to the user equipment 350 over QAM. In addition to other benefits described herein, the network 300 may use fewer devices (e.g., network equipment) than traditional systems. For example, the network 300 might not use both a QAM origin device and an IP origin device, and might instead use just an IP origin device. This may result in a simplification of the network infrastructure used to transmit content via QAM delivery and a cost savings to the origin infrastructure.

Figure 4:
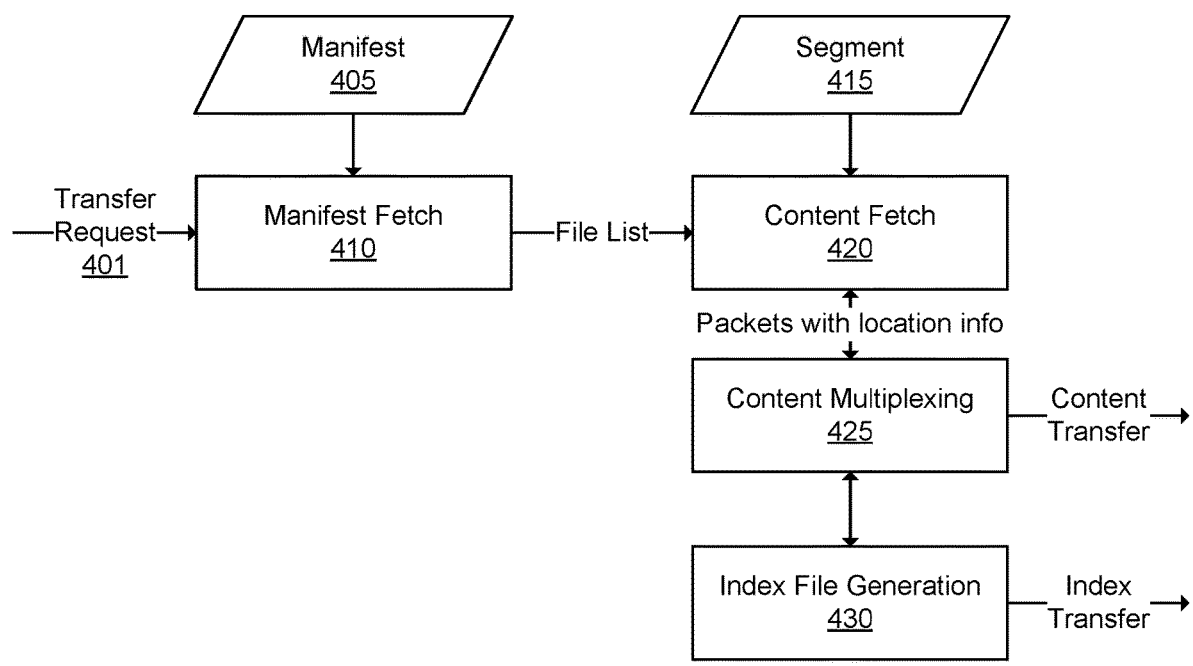
FIG. 4 shows an example Quadrature Amplitude Modulation packager according to one or more illustrative aspects of the disclosure.

FIG. 4 shows an example QAM packager 400 according to one or more illustrative aspects of the disclosure. The QAM packager 400 may comprise, for example, the QAM packager 335 described above with reference to FIG. 3.

The QAM packager 400 may comprise a manifest fetch device 410. The manifest fetch device 410 may receive a transfer request 401. The transfer request 401 may come from the streaming server 340. The manifest fetch device 410 may also receive (e.g., request, retrieve, and/or receive) a manifest 405 in response to the transfer request 401. The manifest 405 may comprise, for example, a DASH manifest. The manifest 405, which may be received or generated during the ingest process described above, may indicate the segments (e.g., DASH segments) that make up the content (e.g., an asset), such as VOD content or other content. For each segment, the type of data (e.g., audio or video) that the segment contains and the segment's relative position in the timeline of the asset may be known using the manifest 405.

When a segment is constructed, location information (e.g., a timestamp, such as a Program Clock Reference or PCR) may be embedded in one or more transport packet (e.g., an MPEG2 transport packet) of the segment. Moreover, the packets of a segment may be delivered at a constant rate. For example, audio may be delivered at a constant bit rate and video may be delivered piecewise continuous. Location information (e.g., the PCR data) may be created for transport packets that do not already have location information. By including location information, packets may be arranged in an increasing order during multiplexing.

The manifest fetch device 410 may generate a file list having data from the manifest 405 and send the file list to a content fetch device 420 of the QAM packager 400. The content fetch device 420 may comprise, for example, an MPEG2 transport file fetch device. The content fetch device 420 may receive (e.g., request, retrieve, and/or receive) one or more segments 415, such as DASH segments. The segments 415 received by the content fetch 420 may comprise the segments identified in the file list from the manifest fetch device 410. The content fetch device 420 may package the manifest data and segment data into a content transfer satisfying a transfer request 401. For example, the content fetch device 420 may arrange the video and audio segments together such that location information, such as the PCRs, is consistent between the audio and video segments. By maintaining consistency, the audio and video may be decoded using the same decoder constraints as the original multiplexed MPEG2 transport stream.

Figure 5:
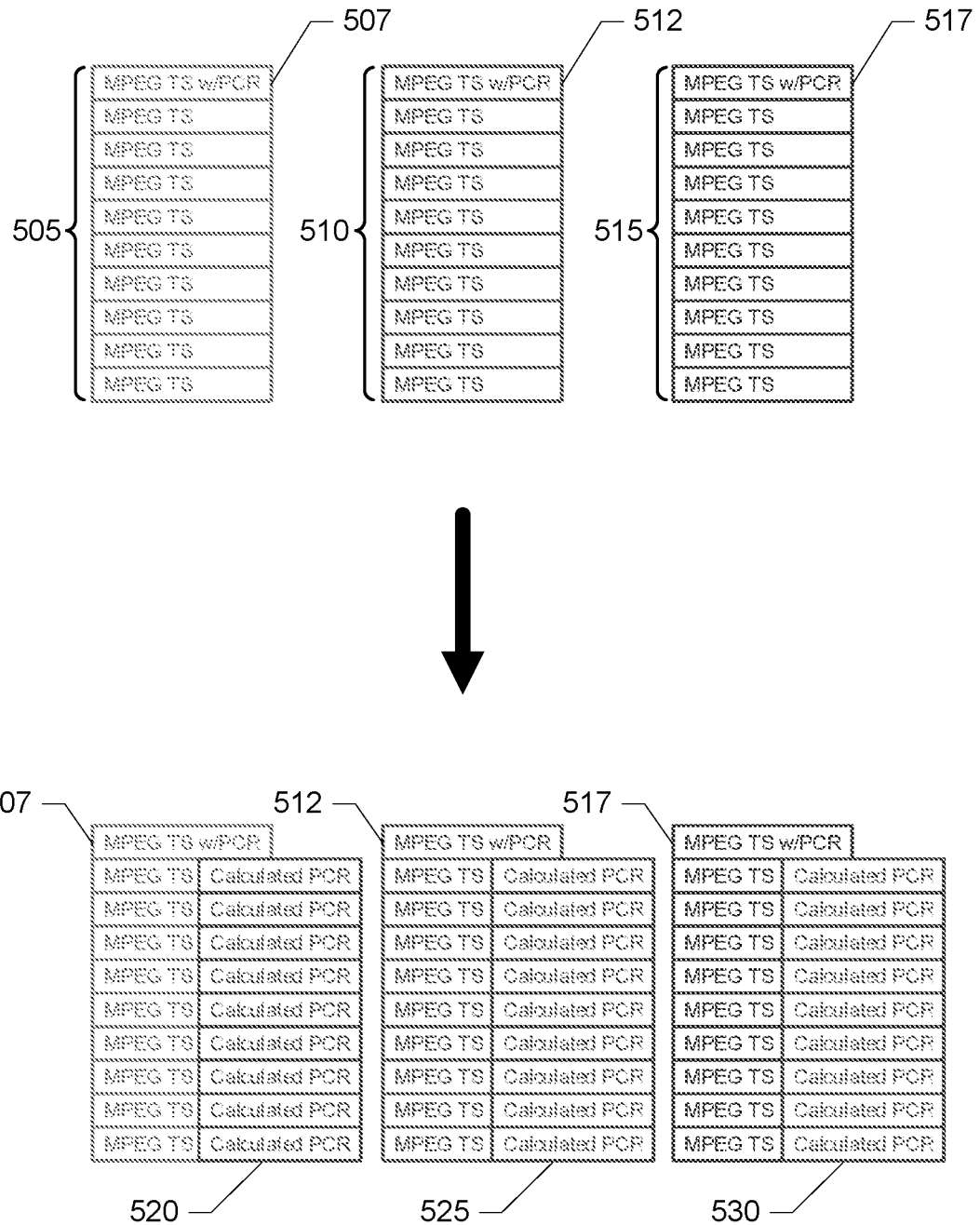
FIG. 5 shows example content segments comprising one or more packets according to one or more illustrative aspects of the disclosure.

FIG. 5 shows example content segments comprising one or more packets according to one or more illustrative aspects of the disclosure. The content fetch device 420 described above may receive one or more segments 415 of video and/or audio. For example, the device 420 may receive a video segment 505 comprising a plurality of video packets, a first audio segment 510 comprising a plurality of audio packets in a first format, and a second audio segment 515 comprising a plurality of packets in a second format. Each segment may include one or more pieces of location information (e.g., PCR data). Each of the exemplary segments shown in FIG. 5 comprises a single PCR for the first packet in the corresponding segment, such as PCR 507 for the first packet in the segment 505, PCR 512 for the first packet in the segment 510, and PCR 517 for the first packet in the segment 515. The content fetch device 420 may use interpolation or extrapolation to calculate or otherwise determine the remaining PCRs.

Some segments (or groups of packets) may comprise multiple embedded PCRs. For example, this may occur for video segments. When there are multiple PCRs in a segment, the content fetch device 420 may use interpolation to determine PCRs for one or more of the packets that do not have PCRs, such as packets between the packets that have PCRs. For example, assume that $PCR_{P1}$ (e.g., 25,769,803) represents the PCR for packet P1 (e.g., packet number 25) and $PCR_{P2}$ (e.g., 30,074,241) represents the PCR for packet P2 (e.g., packet number 343). Also assume that PACKETS represents a number that is one more than the number of packets between packet P1 and packet P2 (e.g., 319 if P1 is packet 25 and P2 is packet 343). The content fetch device 420 may determine the PCR for the $q^{th}$ transport packet after P1 (e.g., $PCR_q$) using the following expression:

$$PCR_q = PCR_{P1} + (q*[(PCR_{P2} - PCR_{P1})/PACKETS])$$

Using the example data above, the PCR of the tenth transport packet after P1 (e.g., packet number 35) may be 25,769,803+(10*[(30,074,241−25,769,803)/319])=25,904,738.

Some segments may comprise a single PCR (e.g., PCR 507, PCR 512, or PCR 517 shown in FIG. 5) that occurs at the start of a segment, such as each of the segments 505, 510, and 515. The content fetch device 420 may also use interpolation to calculate or otherwise determine PCRs for one or more of the other packets (e.g., calculated PCRs 520, 525, and/or 530 shown in FIG. 5). Assume that $PCR_N$ (e.g., 25,769,903) represents the PCR for the packet at the start of the segment N and that $PCR_{N+1}$ (e.g., 79,823,803) represents the PCR at the start of the next segment (e.g., segment N+1). Also assume that PACKETS represents the number of packets (e.g., 3993 MPEG transport packets) in the segment (e.g., segments 505, 510, or 515). The content fetch device 420 may determine the PCR for the m$^{th}$ transport packet (e.g., PCR$_m$) using the following expression:

$$PCR_m = PCR_N + (m*[(PCR_{N+1} - PCR_N)/PACKETS])$$

Using the example data above, the PCR of the fifteenth transport of the segment would be 25,769,903+(15*[(79,823,803−25,769,903)/3993])=25,972,960.

The above expression might not work for the final segment of an asset as there is no next segment, and the content fetch device 420 may use extrapolation using the previous segment (e.g., segment N−1) and the PCR for the first packet in the current segment (e.g., segment N or the last segment) to determine one or more PCRs for other packets in the current segment. Assume that PCR$_N$ (e.g., 79,823,803) represents the PCR at the start of segment N (e.g., for the first packet in segment N) and that PCR$_{N-1}$ (e.g., 25,769,903) represents the PCR at the start of segment N−1 (e.g., for the first packet in segment N−1). Also assume that PACKETS represents the number of packets in segment N−1 (e.g., 3993). The content fetch device 420 may determine the PCR for the m$^{th}$ transport packet (e.g., PCR$_m$) in segment N using the following expression:

$$PCR_m = PCR_N + (m*[(PCR_N - PCR_{N-1})/PACKETS])$$

"m" may be 0 for the first packet in segment N. Using the example data above, the PCR of the twentieth transport of the segment would be 79,823,803+(20*[(79,823,803−25,769,903)/3993])=80,094,546.

Given the flexibility of the MPEG (e.g., MPEG2) standard, there may be discontinuities in location information (e.g., PCRs). A discontinuity may comprise, for example, a jump forward or a jump backward. Discontinuities may exist to handle problems in distribution or problems that do not occur in delivery of on-demand content. However, when discontinuities do occur, they may be signaled in the original file. During the ingest process, discontinuities may force or otherwise cause a computing device to generate segment boundaries, such as DASH segment boundaries. As previously described, the DASH manifest may maintain the order of the files so that devices are not limited to only using PCR or other location data to order transport packets.

There may be a practical limit to the size of a PCR. When the limit is reached, standard unsigned finite math rules may be applied, and the PCR value may wrap around to zero. Although this might at first seem to be a discontinuity to the system, it may still be considered continuous. As a result, it is not signaled as a discontinuity, however, because it occurs at a well-known value and can be anticipated. Wrap arounds might be unlikely to occur as content items, such as VOD assets, may be constructed with an initial PCR of zero (0). With this starting value, a transport stream might have to be longer than twenty-six hours before there is a PCR rollover. For example, the PCR value may be encoded as 33 bits from a 90 kHz clock and/or 9 bits from a 27 MHz clock. The largest 33 bit (unsigned) value may be 8,589,934,591 which, if converted from ticks of a 90 kHz clock, may give a time value of 95443.7168 seconds (or 26.51 hours). The 9 bits from the 27 MHz clock may be insignificant.

Returning to FIG. 4, the QAM packager 400 may comprise a content multiplexing device 425, such as an MPEG2 transport file multiplexing device. The content fetch device 420 may send packets with location information (e.g., PCR data) to the content multiplexing device 425. The content multiplexing device 425 may multiplex (e.g., re-multiplex) the content received from the content fetch device 420 and may transfer the multiplexed content, such as multiplexed MPEG content (e.g., video segments and/or audio segments), to the streaming server (e.g., streaming server 340) for delivery to users.

The QAM packager 400 may also comprise an index file generation device 430. The index file generation device 430 may generate, based on manifest data, one or more index files for the multiplexed content. QAM content streaming may use an index file that identifies the location of selected packets (e.g., access units) within the transport stream. The index file generation device 430 may generate (e.g., construct) the index file after examining the transport stream multiplexed (e.g., re-multiplexed) by the content multiplexed device 425. The index file may comprise, for example, three sections: a file header section, an index header section, and an index record section.

Figure 6:
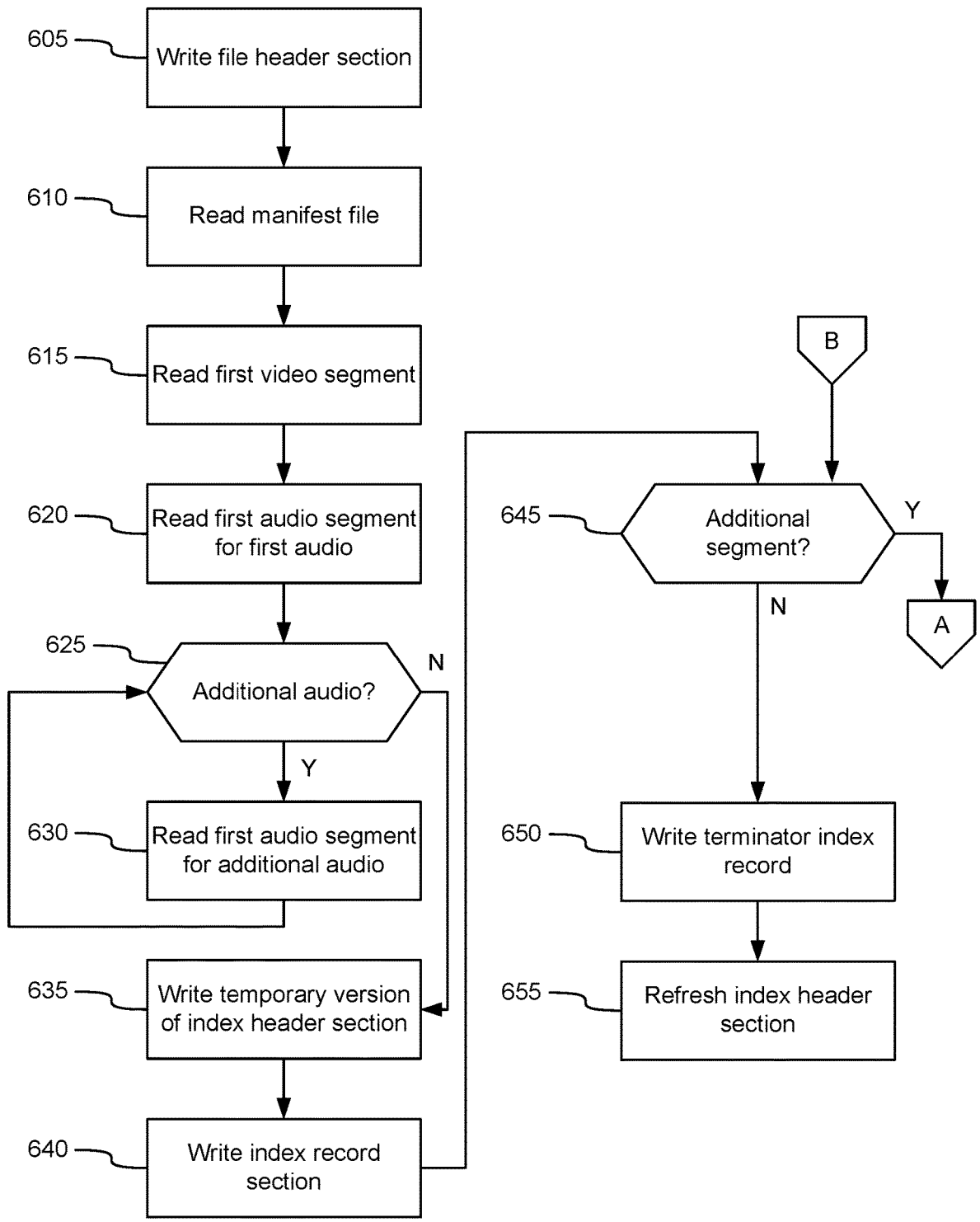
FIG. 6 shows an example method of generating index data for data packets according to one or more illustrative aspects of the disclosure.

FIG. 6 shows an example method of generating index data for data packets according to one or more illustrative aspects of the disclosure. The steps shown in FIG. 6 may be performed, for example, by an index file generation device, such as the index file generation device 430. In step 605, the index file generation device 430 may write a file header section. The file header section of the index file might be fixed and might not vary between MPEG assets. In some aspects, the index file generation device 430 may hard code the file header section of the index file.

The file header section may comprise data, such as a signature, major version, minor version, index file generation number, creator description, and/or checksum. The data in the file header section may be ordered in the order listed above. The signature may comprise a string, such as a video index file. The major version may comprise version one (1). The version number may be incremented when a change to a specification for delivering content changes functionality of the delivery network. The minor version may comprise version three (3). The version number may be incremented when a change to the specification for delivery content changes functionality of the delivery network. The index generation may be set to one (1) when an object, such as a VOD object, is first generated. If there is a change to any of the files that make up the object (e.g., the index file or another file), the index file generation number may be incremented.

A byte format for the file header may be as follows:

```
STRUCT VodIndexFileHeader
CHAR[24]    Signature       ; NULL filled
UINT8       MajorVersion
UINT8       MinorVersion
UINT8       Generation      ; Incremented each time a specific
                            ; file is changed. Initial value = 1.
CHAR[32]    Creator         ; NULL filled.
UINT32      Checksum
UINT8       Align = 0       ; Aligns the start of the next section
                            ; to a 4 byte boundary.
END VodIndexFileHeader
```

In step 610, the index file generation device 430 may read manifest data (e.g., manifest 405) for the content item, which may be included in a DASH Manifest (MPD) file. As previously explained, the manifest data may indicate a plurality of content segments for the content item.

In step 615, the index file generation device 430 may read the first video segment for the content item. For example, the entire segment may be read if the content item is multiplexed.

In step 620, the index file generation device 430 may read the first audio segment for first audio (e.g., audio in a first format, such as a primary language). As previously described, a video segment may have one or more corresponding audio segments in one or more different formats (e.g., secondary languages or purposes, such as descriptive audio, enhanced dialog, etc.). For example, the example described above with reference to FIG. 5 includes two audio segments for a single video segment. The entire segment may be read if the content item is multiplexed.

In step 625, the index file generation device 430 may determine whether additional audio (e.g., audio in other formats, such as secondary languages or purposes) corresponding to the video segment exist. For example, a second audio corresponding to the video segment may exist, as described above with reference to FIG. 5. If an additional audio track does not exist (step 625: N), the index file generation device 430 may proceed to step 635, as will be described below. If an additional audio segment exists (step 625: Y), the index file generation device 430 may proceed to step 630.

In step 630, the index file generation device 430 may read an audio segment (e.g., the first audio segment) for the additional audio. The index file generation device 430 may return to step 625 to determine whether additional audio exist (and read their respective audio segments). If not, the index file generation device 430 may proceed to step 635.

In step 635, the index file generation device 430 may write a temporary (e.g., an in progress) version of the index header section of the index file. The index header section may comprise one or more pieces of information, such as asset information, transport stream information, elementary stream information, program specific information (PSI), sub file information, zero motion frame information, index record random access information, and other pieces of information. In some aspects, some or most of the index header section can be constructed immediately using data from the manifest file (e.g., DASH manifest file). Some of the index header section data might not be known by the index file generation device 430 until the index record section (described below) is completed or otherwise written by the index file generation device 430. The index header section may be rewritten once the unknown data is learned or otherwise determined by the index file generation device 430, as will be described below. In some aspects, a default value may be written to the index header section, which may be later updated.

The below table lists data, such as tags, that may be written to the index header section (e.g., in step 635) or rewritten at a later step. Some of the data might be constant, and some of the data might not be constant as noted in the table. Some data might be extracted from the manifest, whereas other data might not be extracted from the manifest, as indicated in the table.

| Tag | Written in step 635 | Written rewritten later (e.g., in step 655) | Constant | Extracted from Manifest |
|---|---|---|---|---|
| Index Header | Yes | No | No | No |
| Index Header Checksum | Yes | Rewritten when any other data is written into the header. | No | No |
| Asset Information (Block) | Yes | No | No | No |
| Creation Vendor ID | Yes | No | Yes | No |
| Asset Ingest Time | Yes | No | No | Yes |
| Index Creation Time | Yes | No | No | No |
| Program Version | Yes | No | Yes | No |
| Source File Name | Yes | No | Yes | No |
| File Wrapper Type | Yes | No | Yes | No |
| Transport Packet Size | Yes | No | Yes | No |
| Sync Byte Offset | Yes | No | Yes | No |
| Transport Bit Rate | Yes | No | No | Yes |
| Transport Stream Type | Yes | No | Yes | No |
| Video Bit Rate | Yes | No | No | Yes |
| Video Horizontal Size | Yes | No | No | Yes |
| Video Vertical Size | Yes | No | No | Yes |
| Video Frame Rate Ticks | Yes | No | No | No |
| Video Frame Rate Time Scale | Yes | No | No | No |
| Maximum GOP Size in Picture | N/A | N/A | N/A | N/A |
| Trick PTS DTS Delta | N/A | N/A | N/A | N/A |
| PTS DTS Calculation Method | N/A | N/A | N/A | N/A |
| Initial Decoding Delay | N/A | N/A | N/A | N/A |
| Trick Delay From EOF | N/A | N/A | N/A | N/A |
| Program Stream Count | Yes | No | Yes | No |
| Elementary Stream Count (Block) | Yes | No | No | Yes |
| Sub File Count | Yes | No | Yes | No |
| PCR Interval Packet Count | N/A | N/A | N/A | N/A |
| SCTE-35 Record Count | N/A | N/A | N/A | N/A |
| Sub File Dynamic | Yes | No | Yes | No |
| Open For Write | Yes | Upon completion of the index file | Yes | No |
| Provider Identifier | N/A | N/A | N/A | N/A |
| Asset Identifier | N/A | N/A | N/A | N/A |
| No Zero NPT | N/A | N/A | N/A | N/A |
| VBR | Yes | No | Yes | No |
| Transport Stream Information (Block) | Yes | No | No | No |
| Transport Stream Program Number | Yes | No | No | No |
| Transport Stream PMT PID | Yes | No | No | No |
| Transport Stream PCR PID | Yes | No | No | No |
| Transport Stream Video PID | Yes | No | No | No |
| Transport Stream Audio PID | Yes | No | No | No |
| Transport Stream ECM PID | N/A | N/A | N/A | N/A |
| Transport Stream SCTE-35 PID | N/A | N/A | N/A | N/A |
| Elementary Stream Information (Block) | Yes | No | No | No |
| Elementary Stream Type | Yes | No | No | No |
| Elementary Stream Sub Type | Yes | No | No | No |
| Elementary Stream PID | Yes | No | No | No |
| Elementary Stream Descriptor | Yes | No | No | No |
| Elementary Stream Sequence | N/A | N/A | N/A | N/A |
| Elementary Stream Extended Sequence | N/A | N/A | N/A | N/A |
| Elementary Stream Sequence Parameter Set | N/A | N/A | N/A | N/A |
| Elementary Stream Packetized Stream Identifier | Yes | No | No | No |
| Frame Packing Descriptor | Yes | No | No | No |
| Elementary Stream Bit Rate | Yes | No | No | Yes |
| Audio Sample Rate | Yes | No | No | Yes |
| Audio Channels | Yes | No | No | No |
| Elementary Stream Picture Parameter Set | Yes | No | No | No |
| PSI Information (Block) | Yes | No | No | No |
| Program Association Table | Yes | No | No | No |
| Program Conditional Access Table | Yes | No | No | No |

-continued

| Tag | Written in step 635 | Written rewritten later (e.g., in step 655) | Constant | Extracted from Manifest |
|---|---|---|---|---|
| Program Map Table | Yes | No | No | No |
| Program Network Information Table | Yes | No | No | No |
| Program Time And Date Table | Yes | No | No | No |
| Sub File Information (Block) | Yes | No | No | No |
| Sub File Index | Yes | No | Yes | No |
| Sub File Name | Yes | No | No | No |
| Sub File Type | Yes | No | Yes | No |
| Sub File Starting Byte | Yes | No | No | No |
| Sub File Ending Byte | Yes | Upon completion of the index file | No | No |
| Sub File Starting PCR | Yes | No | No | No |
| Sub File N + 1 PCR | Yes | Upon completion of the index file | No | No |
| Sub File Starting Continuity Counter | Yes | No | No | No |
| Sub File Ending Continuity Counter | Yes | No | No | No |
| Sub File Play Time In Millisecond | Yes | Upon completion of the index file | No | No |
| Sub File Play Direction | Yes | No | Yes | No |
| Sub File Speed Numerator | Yes | No | Yes | No |
| Sub File Speed Denominator | Yes | No | Yes | No |
| Sub File I Picture Count | Yes | No | No | No |
| Sub File P Picture Count | No | No | No | No |
| Sub File B Picture Count | No | No | No | No |
| Sub File Checksum | No | No | No | No |
| Sub File IDR Picture Count | Yes | Upon completion of the index file | No | No |
| Zero Motion Frame Information (Block) | N/A | N/A | N/A | N/A |
| Zero Motion Frame B Frame | N/A | N/A | N/A | N/A |
| Zero Motion Frame P Frame | N/A | N/A | N/A | N/A |
| Index Record Random Access Information (Block) | N/A | N/A | N/A | N/A |
| Index Rate | N/A | N/A | N/A | N/A |
| Worst Case Offset | N/A | N/A | N/A | N/A |

Some of the index header section data listed in the above table will now be described in more detail. The index header section may comprise asset information. The asset information may describe the asset as a whole and may comprise a mixture of constant data and data extracted from the manifest file. Data extracted from the manifest file may include, for example, the bit rate of a transport stream, the bit rate of an elementary stream, one or more PIDs, etc. Constant data may comprise data that does not change, which may include the name of the company that created the index header (e.g., the content owner). The asset information may comprise, for example, a block tag. The block tag may comprise a plurality of tags that have a common purpose, such as if the data that follows from any of the tags in the block tag are not needed and can be skipped instead of read.

In some aspects, asset information may comprise three pieces of information: a tag that identifies the data that follows (e.g., an open for write tag), a length that indicates the length or size (e.g., bytes) of the data that follows, and the data itself (e.g., payload data). For example, a piece of data may comprise an open for write tag, length data indicating that the payload data is one byte in length, and payload data of false (e.g., indicated by a value of zero) or true (e.g., indicated by a value of FF). The payload of the open for write data may be set to true while data is being generated (and additional data is being written and/or additional data is in the stream) or false when data, such as a trick file, is completed and/or cached.

The index header section may comprise transport stream information, which may also comprise a single block tag. The data for the transport stream information or tag may be extracted from a program map table (PMT) associated with a data segment (e.g., a video segment or an audio segment). The PMT may be at the start of one of the segments. Accordingly, in order to construct the transport stream information, the index file generation device 430 may read a single segment (as opposed to multiple segments).

The index header section may comprise elementary stream information. In some aspects, the elementary stream information may comprise a block tag that is repeated for every elementary stream to be present in the final multiplex. For example, there may be two block tags, one for video and one for audio. For each additional audio, there may be an additional block tag. For audio elementary streams, the elementary stream information may be found in the manifest file. For video streams, the index file generation device 430 may read a single segment (e.g., the video segment) to generate the tag.

The index header section may comprise program specific information (PSI), which may comprise a single block tag. The index file generation device 430 may extract the data for this tag from the PAT and PMT at, for example, the start of one or more segments. In some aspects, the index file generation device 430 may construct the PSI tag by reading a single segment.

The index header section may comprise sub file information. The sub file information may comprise a pair of block tags, with one tag having information for the index file and one tag having information for the multiplexed transport stream. In some aspects, select values might not be known until the entire index file (including the index record section) is written. Other values, on the other hand, may be known after reading the first video segment.

The index header section may comprise zero motion frame information, such as for MPEG-2 streams. The zero motion frame information may indicate zero motion frames for a source of the content. The zero motion frame information might not be used for MPEG-4 streams.

The index header section may comprise index record random access information. This information may be used as placeholders before the index file section is completed. For example, the placeholders may be replaced with data that is later generated to complete the index file section (e.g., in the rewriting process for the index file section), as will be described in further detail below.

In step 640, the index file generation device 430 may write an index record section. The index record section may comprise one or more pieces of information, such as location of access units in the multiplexed file used for operation of the streaming server device 340. For example, the index record section may comprise an audio index record, one or more video coding index records (e.g., an advanced video coding (AVC) normal rate I picture index record, an AVC picture supplemental enhancement information (SEI) message index record, etc.), an end of group of pictures (GOP) index record, a gap index record, a PCR index record, a terminator index record, and other pieces of information.

The index record section may comprise an audio index record, and the audio index record may be created for each audio segment. The audio index record may indicate the location of the first audio packet (which may comprise the fourth packet of the segment) in the multiplexed stream.

The index record section may comprise a video coding index record, such as an AVC normal rate I picture index record. In some aspects, at least one of these records may be created for each video segment, and the record may indicate the location of the first packet of each I picture in the multiplexed stream.

The index record section may comprise additional video coding index records, such as an AVC picture SEI message index record. In some aspects, one of these records may be created prior to each AVC normal rate I picture index record. The AVC picture SEI message index record may indicate a location, type, and/or length of SEI messages received with the video data.

The index record section may comprise an end of GOP index record. In some aspects, one of these records may be created prior to each AVC picture SEI message index record, except the first. There may also be an end of GOP index record prior to the terminator index record, which will be described below. The end of GOP index record may indicate the end of a GOP, such as in a normal rate file.

The index record section may comprise a gap index record. In some aspects, one gap index record might be created at the start of the multiplexed file. The gap index record may indicate when a new PCR value is to be generated.

The index record section may comprise a PCR index record (or other location information record). In some aspects, one record might be created for each transport packet that contains a PCR in the multiplexed stream. The PCR index record may indicate the packet in a received file that has the PCR value.

The index record section may comprise a terminator index record. In some aspects, one record might be created and added to the end of the index file. The terminator index record may indicate the end of the index record for a data stream.

In step 645, the index file generation device 430 may determine whether additional segments, such as video or audio segments, exist. If additional segments do not exist (step 645: N), the index file generation device 430 may proceed to step 650, as will be described below. If additional segments exist (step 645: Y), the index file generation device 430 may perform one or more of the steps shown in FIG. 7.

Figure 7:
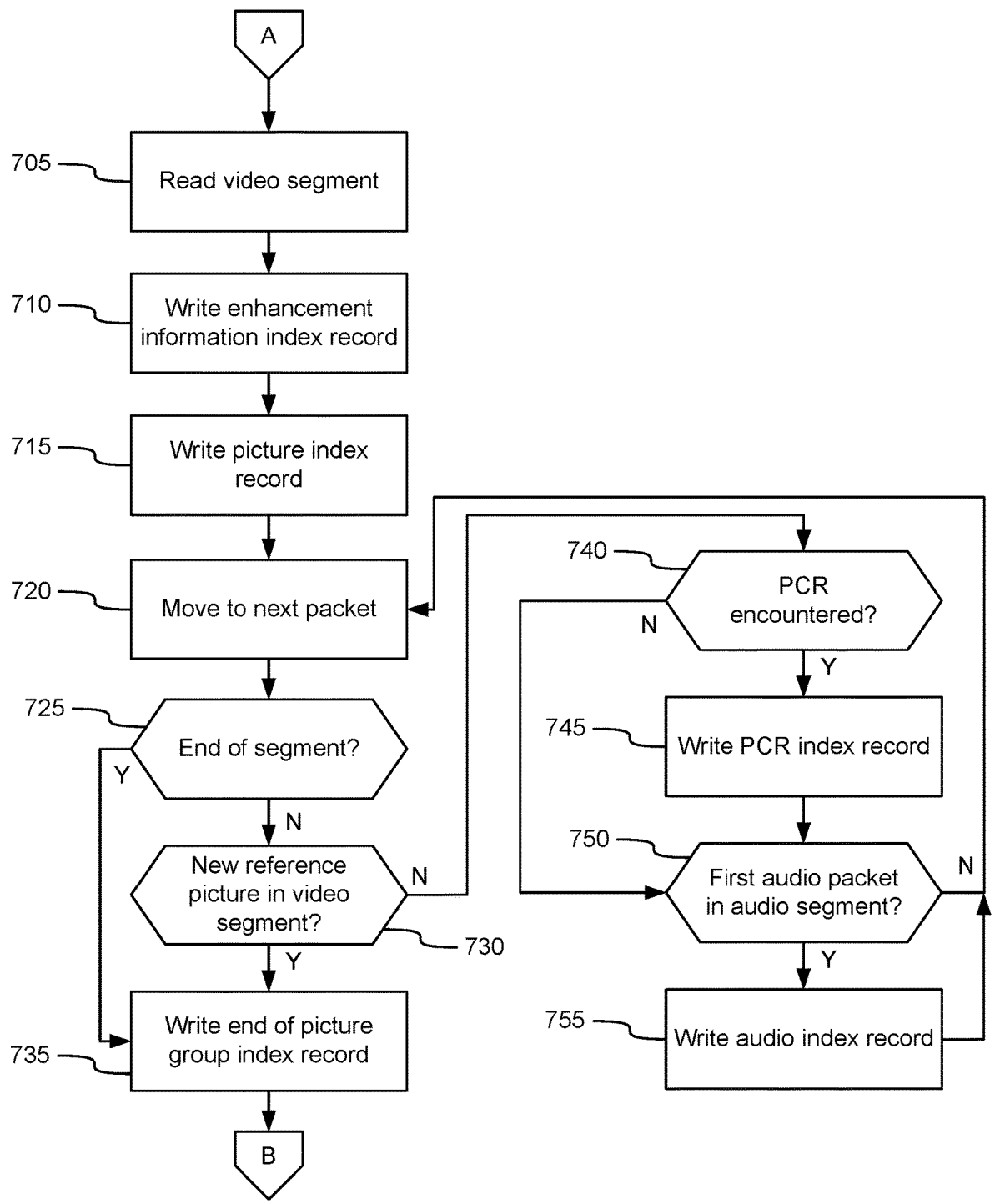
FIG. 7 shows an example method of generating index data for data packets according to one or more illustrative aspects of the disclosure.

FIG. 7 shows an example method of generating index data for data packets according to one or more illustrative aspects of the disclosure. In some aspects, the index file generation device 430 may loop through one or more of the steps shown in FIG. 7 until it reaches the end of a plurality of segments for a content item, such as all of the segments (e.g., the end of a movie or a television show or a portion thereof).

In step 705, the index file generation device 430 may read the additional video segment. Step 705 may be similar to step 615 previously described with reference to FIG. 6.

In step 710, the index file generation device 430 may write an enhancement information index record for the video segment. For example, the device 430 may write an AVC picture SEI message index record.

In step 715, the index file generation device 430 may write a picture index record for the additional video segment. For example, the device 430 may write an AVC normal rate I picture index record.

In step 720, the index file generation device 430 may move to the next packet in the segment. The packet (or data therefrom) that has been read may be multiplexed with the other packets that have already been read by the index file generation device 430.

In step 725, the index file generation device 430 may determine whether it has reached the end of the segment or picture group (e.g., a GOP for MPEG streams). If so (step 725: Y), the index file generation device 430 may proceed to step 735, which will be described below. If not (step 725: N), the index file generation device 430 may proceed to step 730.

In step 730, the index file generation device 430 may determine whether the packet is a new reference picture in a video segment. For example, the device 430 may determine whether the packet is a new I picture of the video segment in the case of MPEG video. If not (step 730: N), the index file generation device 430 may proceed to step 740, which will be described below. If the index file generation device 430 determines that the packet is a new reference picture (step 730: Y), the computing device may proceed to step 735.

In step 735, the index file generation device 430 may write an end of picture group index record for the segment. For an MPEG stream, the picture group may comprise a GOP. The index file generation device 430 may return to step 645 shown in FIG. 6 to determine whether additional video segments exist.

In step 740, the index file generation device 430 may determine whether a PCR has been encountered, such as whether the current packet has a PCR. If so (step 740: Y), the device 430 may proceed to step 745 and write a PCR index record. Otherwise (step 740: N), the index file generation device 430 may proceed to step 750.

In step 750, the index file generation device 430 may determine whether the packet is the first audio packet in an audio segment. If so (step 750: Y), the device 430 may proceed to step 755 and write an audio index record. Otherwise (step 750: N), the device 430 may determine that the packet is a video packet comprising a picture that is not a reference picture (e.g., is not an I picture in an MPEG stream, but rather is a B or P picture) and may count it for the end of picture group index record. The device 430 may return to step 720 and move to read and/or analyze the next packet of the segment. As described above, if no other packets exist in the segment, the device 430 may return to step 645 shown in FIG. 6 to determine whether additional segments (e.g., video or audio segments) exist. Returning to FIG. 6, if no other segments exist (step 645: N), the index generation device 430 may proceed to step 650.

In step 650, the index file generation device 430 may write a terminator index record. The terminator index record may indicate the end of the index record for a data stream.

In step 655, the index file generation device 430 may refresh (e.g., rewrite) the index header section. For example, the device 430 may replace or supplement the index header section with completed data determined while generating the index record section. Examples of data that may be rewritten in step 655 are provided in the table above described with reference to step 635.

The index file generation device 430 may finish generating an index file for content to be transferred to a user device (e.g., user equipment 350), such as via the streaming server 340. In some aspects, QAM delivery may be sensitive to latency. Delivery of the first byte (or other length of data) of either the MPEG (e.g., MPEG2) transport stream or the QAM index file might not use the complete re-multiplexing of the DASH Segments.

The QAM packager 400 (or 335) may send to a streaming server (e.g., the streaming server 340) a single multiplexed file containing an MPEG (e.g., MPEG2) transport stream and its corresponding index data (e.g., QAM index file) given the location of a DASH manifest.

Alternative aspects of the system and method described above will now be described. In some aspects, the IP packager 325 and/or the QAM packager 335 may receive multiple audio files. However, the IP packager 325 and/or the QAM packager 335 may determine to deliver only a subset of the audio files to the user equipment 350 (e.g., depending on the capabilities of the user equipment 350).

Audio content may be formatted for stereo applications (e.g., 2 speakers), surround sound applications (e.g., 6 speakers), or any other applications or numbers of speakers. Allowing the original file to have different formats may give the content owner more control over the desired audio experience (e.g., stereo, surround, or otherwise). It also allows the system 300 to match content delivery to the capabilities of the receiving device (e.g., the user equipment 350). Oftentimes, content delivered via QAM may be used by user equipment 350 having surround sound capabilities (e.g., 6 speakers for a home theater-like experience). Accordingly, the QAM packager 335 may determine to multiplex the surround sound based audio into the content stream. The QAM packager 335 might not multiplex the stereo based audio into the content stream.

Content delivered via IP packaging may be used by user equipment 350 that are natively stereo sound based, such as smartphones, tablets, and the like. Accordingly, the IP packager 325 may determine to identify the stereo sound based audio in the manifest. The IP packager 325 might not identify the surround sound based audio in the manifest. In other words, the IP packager 325 and/or the QAM packager 335 may deliver one of the audio formats even if two or more audio formats are available in the original multiplexed transport stream. This may cause less transportation bandwidth to be consumed than if all of the audio formats are delivered to the user equipment 350. The IP packager 325 and/or the QAM packager 335 may determine the audio to include based on the capabilities of the user equipment 350 or other information, which may be indicated in the manifest data (e.g., a DASH manifest file).

Aspects described herein may be used to select the audio format(s) to deliver to the user equipment 350 for video on demand (VOD) content. Traditionally, VOD content is offered in one language and/or there may been no way to select specific language tracks, so all languages are delivered. Each additional language delivered by the system may noticeably change the capacity of the system. In order to reduce the load on the system, the IP packager 325 and/or the QAM packager 335 may determine which language or languages to deliver. The system 300 may inform the user of the different language options and receive a selection of one or more languages from the user. The selection may be passed by the system 300 to the IP packager 325 and/or the QAM packager 335. The IP packager 325 and/or the QAM packager 335 may determine which languages to deliver based on the user's selection. Using this method, the system 300 may manage the system capacity by, for example, only delivering one or two audio programs. The delivered audio programs may be the ones that have the most value to the user actually consuming the on demand asset or the user equipment playing back the asset. For example, the system 300 may deliver audio that is compatible with the user equipment 350 or audio that is selected by the user.

The various features described above are merely non-limiting examples, and can be rearranged, combined, subdivided, omitted, and/or altered in any desired manner. For example, features of the computing devices described herein can be subdivided among multiple processors and computing devices. The true scope of this patent should only be defined by the claims that follow.

The invention claimed is:

1. An apparatus comprising:
one or more processors; and
memory storing instructions that, when executed by the one or more processors, cause the apparatus to:
store a content segment in a first format;
receive a request for the content segment, wherein the request is associated with a second format different from the first format;
generate, based on the request, the content segment in the second format, wherein:
timing for a first plurality of packets, comprising the content segment in the first format, is indicated by timing information in fewer than all of the first plurality of packets,
timing for a second plurality of packets, comprising the content segment in the second format, is indicated by timing information in each of the second plurality of packets,
a first packet of the second plurality of packets comprises first timing information that is also in a first packet of the first plurality of packets; and
other packets of the second plurality of packets each comprise timing information that is based on the first timing information; and
send, to one or more user devices, the second plurality of packets.

2. The apparatus of claim 1, wherein the instructions, when executed by the one or more processors, cause the apparatus to:
determine the first plurality of packets based on a manifest file formatted for Dynamic Adaptive Streaming over HTTP (DASH).

3. The apparatus of claim 1, wherein the instructions, when executed by the one or more processors, cause the apparatus to:
generate, based on a manifest file, index data that indicates timing information for each packet of the second plurality of packets;
format the second plurality of packets for Quadrature Amplitude Modulation (QAM) delivery; and
send, to the one or more user devices, the index data and the formatted second plurality of packets.

4. The apparatus of claim 1, wherein the content segment comprises one or more video segments and one or more audio segments.

5. The apparatus of claim 1, wherein the instructions, when executed by the one or more processors, cause the apparatus to:
generate, based on a manifest file, index data that indicates timing information for each packet of the second plurality of packets, wherein the index data comprises:
an index header section for a content delivery associated with the second format; and
an index record section for the content delivery associated with the second format; and
send, to the one or more user devices, the index data and the second plurality of packets.

6. The apparatus of claim 5, wherein at least a portion of the index header section comprises temporary data, and wherein the instructions, when executed by the one or more processors, cause the apparatus to generate the index data by:
    after populating the index record section with index record section data, replacing the temporary data in the index header section with different data.

7. The apparatus of claim 1, wherein the content segment is a first content segment, and the timing information comprised in the other packets of the second plurality of packets is also based on timing information of a second content segment occurring after the first content segment in a content item.

8. The apparatus of claim 7, wherein the timing information of the second content segment comprises a beginning time of the second content segment.

9. The apparatus of claim 1, wherein the timing information comprised in the other packets of the second plurality of packets is also based on a quantity of packets associated with the content segment.

10. The apparatus of claim 1, wherein the timing for the first plurality of packets is indicated by a timestamp at a start of the first plurality of packets.

11. The apparatus of claim 1, wherein the first timing information is in only one packet of the first plurality of packets.

12. The apparatus of claim 1, wherein the instructions, when executed by the one or more processors, cause the apparatus to:
    determine the timing information comprised in each of the other packets of the second plurality of packets by interpolation based on the first timing information.

13. The apparatus of claim 1, wherein the instructions, when executed by the one or more processors, cause the apparatus to:
    use the content segment in the first format to provide:
        Internet Protocol (IP) delivery of the content segment; and
        Quadrature Amplitude Modulation (QAM) delivery of the content segment.

14. An apparatus comprising:
    one or more processors; and
    memory storing instructions that, when executed by the one or more processors, cause the apparatus to:
        determine, based on manifest data for a content item, a plurality of packets corresponding to a segment of the content item, wherein a first packet of the plurality of packets comprises a first timestamp corresponding to the segment; and
        based on a request for the content item, send the plurality of packets by:
            sending the first packet, of the plurality of packets, comprising the first timestamp;
            adding, to subsequent packets of the plurality of packets, a second timestamp that is based on:
                the first timestamp; and
                total quantity of packets in the plurality of packets; and
            sending the subsequent packets of the plurality of packets.

15. The apparatus of claim 14, wherein the instructions, when executed by the one or more processors, cause the apparatus to send the plurality of packets by:
    sending, using Quadrature Amplitude Modulation (QAM) delivery, index data associated with the first timestamp.

16. The apparatus of claim 14, wherein the first timestamp comprises a program clock reference (PCR), and wherein the second timestamp comprises a different PCR.

17. The apparatus of claim 14, wherein the instructions, when executed by the one or more processors, cause the apparatus to:
    determine, based on interpolation or extrapolation of the first timestamp, the second timestamp.

18. An apparatus comprising:
    one or more processors; and
    memory storing instructions that, when executed by the one or more processors, cause the apparatus to:
        determine a first timestamp of a first segment of content and a second timestamp of a second segment of the content, wherein the second segment follows the first segment in the content;
        generate, based on a difference between the first timestamp and the second timestamp, a plurality of timestamps for a plurality of packets associated with the first segment of the content;
        generate index data for the plurality of packets, wherein the index data indicates the first timestamp and the generated plurality of timestamps; and
        send, to one or more user devices, the plurality of packets and the index data.

19. The apparatus of claim 18, wherein the instructions, when executed by the one or more processors, cause the apparatus to send the plurality of packets and the index data by:
    sending, using Quadrature Amplitude Modulation (QAM) delivery, the plurality of packets and the index data, wherein the first segment and the second segment are formatted for Dynamic Adaptive Streaming over HTTP (DASH).

20. The apparatus of claim 18, wherein the first timestamp comprises a first program clock reference (PCR), and wherein each of the plurality of timestamps comprises a PCR different from each other and from the first PCR.

21. The apparatus of claim 18, wherein the instructions, when executed by the one or more processors, cause the apparatus to generate the plurality of timestamps by performing, based on the first timestamp and the second timestamp, an interpolation or an extrapolation.

22. The apparatus of claim 18, wherein the index data comprises an index header section and an index record section, and wherein the first timestamp and the generated plurality of timestamps are indicated in the index record section.

23. The apparatus of claim 22, wherein the instructions, when executed by the one or more processors, cause the apparatus to generate the index data by:
    writing data to the index header section;
    writing data to the index record section after writing data to the index header section; and
    re-writing data to the index header section after writing data to the index record section.

24. A non-transitory computer readable medium storing instructions that, when executed, cause:
    storing a content segment in a first format;
    receiving a request for the content segment, wherein the request is associated with a second format different from the first format;

generating, based on the request, the content segment in the second format, wherein:
  timing for a first plurality of packets, comprising the content segment in the first format, is indicated by timing information in fewer than all of the first plurality of packets,
  timing for a second plurality of packets, comprising the content segment in the second format, is indicated by timing information in each of the second plurality of packets,
  a first packet of the second plurality of packets comprises first timing information that is also in a first packet of the first plurality of packets; and
  other packets of the second plurality of packets each comprise timing information that is based on the first timing information; and
  sending, to one or more user devices, the second plurality of packets.

25. The non-transitory computer readable medium of claim 24, wherein the instructions, when executed, cause:
  determining the first plurality of packets based on a manifest file formatted for Dynamic Adaptive Streaming over HTTP (DASH).

26. The non-transitory computer readable medium of claim 24, wherein the instructions, when executed, cause:
  generating, based on a manifest file, index data that indicates timing information for each packet of the second plurality of packets;
  formatting the second plurality of packets for Quadrature Amplitude Modulation (QAM) delivery; and
  sending, to the one or more user devices, the index data and the formatted second plurality of packets.

27. The non-transitory computer readable medium of claim 24, wherein the content segment comprises one or more video segments and one or more audio segments.

28. The non-transitory computer readable medium of claim 24, wherein the instructions, when executed, cause:
  generating, based on a manifest file, index data that indicates timing information for each packet of the second plurality of packets, wherein the index data comprises:
    an index header section for a content delivery associated with the second format; and
    an index record section for the content delivery associated with the second format; and
  sending, to the one or more user devices, the index data and the second plurality of packets.

29. The non-transitory computer readable medium of claim 28, wherein at least a portion of the index header section comprises temporary data, and wherein the instructions, when executed, cause the generating the index data by causing:
  after populating the index record section with index record section data, replacing the temporary data in the index header section with different data.

30. The non-transitory computer readable medium of claim 24, wherein the content segment is a first content segment, and the timing information comprised in the other packets of the second plurality of packets is also based on timing information of a second content segment occurring after the first content segment in a content item.

31. The non-transitory computer readable medium of claim 30, wherein the timing information of the second content segment comprises a beginning time of the second content segment.

32. The non-transitory computer readable medium of claim 24, wherein the timing information comprised in the other packets of the second plurality of packets is also based on a quantity of packets associated with the content segment.

33. The non-transitory computer readable medium of claim 24, wherein the timing for the first plurality of packets is indicated by a timestamp at a start of the first plurality of packets.

34. The non-transitory computer readable medium of claim 24, wherein the first timing information is in only one packet of the first plurality of packets.

35. The non-transitory computer readable medium of claim 24, wherein the instructions, when executed, cause:
  determining the timing information comprised in each of the other packets of the second plurality of packets by interpolation based on the first timing information.

36. The non-transitory computer readable medium of claim 24, wherein the instructions, when executed, cause:
  using the content segment in the first format to provide:
    Internet Protocol (IP) delivery of the content segment; and
    Quadrature Amplitude Modulation (QAM) delivery of the content segment.

37. A non-transitory computer readable medium storing instructions that, when executed, cause:
  determining, based on manifest data for a content item, a plurality of packets corresponding to a segment of the content item, wherein a first packet of the plurality of packets comprises a first timestamp corresponding to the segment; and
  sending, based on a request for the content item, the plurality of packets;
  wherein the instructions, when executed cause the sending by causing:
    sending the first packet, of the plurality of packets, comprising the first timestamp;
    adding, to subsequent packets of the plurality of packets, a second timestamp that is based on:
      the first timestamp; and
      total quantity of packets in the plurality of packets; and
    sending the subsequent packets of the plurality of packets.

38. The non-transitory computer readable medium of claim 37, wherein the instructions, when executed, cause the sending the plurality of packets by causing sending, using Quadrature Amplitude Modulation (QAM) delivery, index data associated with the first timestamp.

39. The non-transitory computer readable medium of claim 37, wherein the first timestamp comprises a program clock reference (PCR), and wherein the second timestamp comprises a different PCR.

40. A non-transitory computer readable medium of claim 37, wherein the instructions, when executed, cause:
  determining, based on interpolation or extrapolation of the first timestamp, the second timestamp.

41. A non-transitory computer readable medium storing instructions that, when executed, cause:
  determining a first timestamp of a first segment of content and a second timestamp of a second segment of the content, wherein the second segment follows the first segment in the content;
  generating, based on a difference between the first timestamp and the second timestamp, a plurality of timestamps for a plurality of packets associated with the first segment of the content;
  generating index data for the plurality of packets, wherein the index data indicates the first timestamp and the generated plurality of timestamps; and sending, to one or more user devices, the plurality of packets and the index data.

42. The non-transitory computer readable medium of claim 41, wherein the instructions, when executed, cause the sending by causing sending, using Quadrature Amplitude Modulation (QAM) delivery, the plurality of packets and the index data, and
   wherein the first segment and the second segment are formatted for Dynamic Adaptive Streaming over HTTP (DASH).

43. The non-transitory computer readable medium of claim 41, wherein the first timestamp comprises a first program clock reference (PCR), and wherein each of the plurality of timestamps comprises a PCR different from each other and from the first PCR.

44. The non-transitory computer readable medium of claim 41, wherein the instructions, when executed, cause the generating the plurality of timestamps by causing performing, based on the first timestamp and the second timestamp, an interpolation or an extrapolation.

45. The non-transitory computer readable medium of claim 41, wherein the index data comprises an index header section and an index record section, and wherein the first timestamp and the generated plurality of timestamps are indicated in the index record section.

46. The non-transitory computer readable medium of claim 45, wherein the instructions, when executed, cause the generating the index data by causing:
   writing data to the index header section;
   writing data to the index record section after writing data to the index header section; and
   re-writing data to the index header section after writing data to the index record section.

* * * * *

UNITED STATES PATENT AND TRADEMARK OFFICE
CERTIFICATE OF CORRECTION

PATENT NO. : 10,979,475 B2
APPLICATION NO. : 16/732978
DATED : April 13, 2021
INVENTOR(S) : Barkley et al.

It is certified that error appears in the above-identified patent and that said Letters Patent is hereby corrected as shown below:

On the Title Page

Column 1, (73) Assignee, Line 2:
Please delete "FFC," and insert --LLC,--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*